US010723295B2

(12) United States Patent
Schumacher et al.

(10) Patent No.: US 10,723,295 B2
(45) Date of Patent: Jul. 28, 2020

(54) METHODS AND SYSTEMS FOR MANAGING BI-DIRECTIONAL CONVERTER BASED BATTERY MODULES

(71) Applicant: THERMO KING CORPORATION, Minneapolis, MN (US)

(72) Inventors: Ryan Wayne Schumacher, Bloomington, MN (US); Michael James Vanous, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 138 days.

(21) Appl. No.: 15/921,977

(22) Filed: Mar. 15, 2018

(65) Prior Publication Data
US 2019/0283695 A1 Sep. 19, 2019

(51) Int. Cl.
*B60L 1/00* (2006.01)
*B60R 16/033* (2006.01)
(Continued)

(52) U.S. Cl.
CPC .......... *B60R 16/033* (2013.01); *H02J 7/0021* (2013.01); *H02J 7/0022* (2013.01);
(Continued)

(58) Field of Classification Search
CPC ............... H02J 7/0065; H02J 7/0021; H02J 2007/0067; H02M 1/14; H02M 1/44; H02M 3/158; B60R 16/033
See application file for complete search history.

(56) References Cited

U.S. PATENT DOCUMENTS 6,600,237 B1    7/2003  Meissner
7,117,044 B2   10/2006  Kocher et al.
(Continued)

FOREIGN PATENT DOCUMENTS

CA    2758898    5/2013
DE   19955406    5/2001
(Continued)

OTHER PUBLICATIONS

European Search Report, issued in the corresponding European patent application No. 19161158.1, dated Aug. 19, 2019, 8 pages.

*Primary Examiner* — Alfonso Perez Borroto
*Assistant Examiner* — Esayas G Yeshaw
(74) *Attorney, Agent, or Firm* — Hamre, Schumann, Mueller & Larson, P.C.

(57) ABSTRACT

Methods and systems for bi-directional converter based battery module control for a vehicle electrical system are provided. The method includes monitoring a plurality of Smart Charging Modules (SCMs). Each of the plurality of SCMs can include a bi-directional converter and a plurality of electric switches. Each of the plurality of electric switches can connect to and control a battery module. The method also includes monitoring a load from the vehicle electrical system. The method further includes determining an operational mode for each of the plurality of SCMs. Also the method includes determining a synchronization pattern for the plurality of SCMs. The synchronization pattern is a pattern for phasing current draws such that a current draw for each of the plurality of SCMs does not overlap with each other. Further the method includes the plurality of SCMs directing power to the load based on the synchronization pattern.

11 Claims, 9 Drawing Sheets

(51) Int. Cl.
  *H02J 7/00* (2006.01)
  *H02M 1/14* (2006.01)
  *H02M 1/44* (2007.01)
  *H02M 3/158* (2006.01)
  *H01M 10/42* (2006.01)

(52) U.S. Cl.
  CPC .. *H01M 10/4257* (2013.01); *H02J 2007/0067* (2013.01); *H02J 2207/20* (2020.01); *H02M 1/14* (2013.01); *H02M 1/44* (2013.01); *H02M 3/158* (2013.01)

(56) References Cited

U.S. PATENT DOCUMENTS

| | | |
|---|---|---|
| 8,441,228 B2 | 5/2013 | Brabec |
| 8,541,905 B2 | 9/2013 | Brabec |
| 9,102,241 B2 | 8/2015 | Brabec |
| 9,199,543 B2 | 12/2015 | Brabec |
| 2004/0257041 A1 | 12/2004 | Nagaoka |
| 2011/0025124 A1* | 2/2011 | Brabec ............... B60L 11/1809 307/9.1 |
| 2011/0245987 A1* | 10/2011 | Pratt .................... H01M 10/44 700/295 |
| 2012/0049820 A1 | 3/2012 | Moussaoui et al. |
| 2016/0226270 A1* | 8/2016 | Kim ..................... H02J 7/0021 |
| 2016/0347194 A1* | 12/2016 | Kanayama ............. H02J 7/045 |

FOREIGN PATENT DOCUMENTS

| | | |
|---|---|---|
| EP | 2068417 | 6/2009 |
| WO | 2011/143158 | 11/2011 |

* cited by examiner

METHODS AND SYSTEMS FOR MANAGING BI-DIRECTIONAL CONVERTER BASED BATTERY MODULES

FIELD

This disclosure relates generally to managing energy sources. More specifically, the disclosure relates to methods and systems for managing bi-directional converter based battery modules.

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, a semi-tractor, a bus, or other similar transport unit). In some embodiments, the transport unit can include a plurality of zones and the TRS can be a multi-zone TRS (MTRS) that is configured to provide independent climate control to each of the plurality of zones within the transport unit. In some embodiments, the transport unit can include a heating, ventilation and air conditioning (HVAC) system. The truck and/or the transport unit can include a vehicle electrical system (see, for example, U.S. Pat. No. 8,441,228 for a description of a vehicle electrical system). The vehicle electrical system can provide electrical power to the electrical loads of the truck and/or the transport unit, and/or to charge or discharge the batteries of the truck and/or the transport unit.

SUMMARY

This disclosure relates generally to managing energy sources. More specifically, the disclosure relates to methods and systems for managing bi-directional converter based battery modules.

In particular, the embodiments described herein can manage and balance multiple energy sources including batteries inn a vehicle electrical system. That is, the embodiments described herein can coordinate the switching of the multiple energy sources via, for example, bi-directional converters. Accordingly, power transfer efficiency can be improved, ripple current management components can be reduced, Electromagnetic interference (EMI) mitigation items can be reduced, and thus system cost (including the cost of capacitance (energy storage) for ripple current (if any) and/or the cost of EMI mitigation components) can be lowered.

In one embodiment, a bi-directional converter based battery module control method for a vehicle electrical system is provided. The method includes monitoring a plurality of Smart Charging Modules (SCMs). Each of the plurality of SCMs can include a bi-directional converter and a plurality of electric switches. Each of the plurality of electric switches can connect to and control a battery module. The method also includes monitoring a load from the vehicle electrical system. The method further includes determining an operational mode for each of the plurality of SCMs. Also the method includes determining a synchronization pattern for the plurality of SCMs. The synchronization pattern is a pattern for phasing current draws such that a current draw for each of the plurality of SCMs does not overlap with each other. Further the method includes the plurality of SCMs directing power to the load based on the synchronization pattern.

In another embodiment, a bi-directional converter based battery module control system for a vehicle electrical system is provided. The control system includes at least one load for operating the vehicle electrical system. The control system also includes a plurality of SCMs. The control system further includes a controller. The controller is configured to monitor the plurality of SCMs. The controller is also configured to monitor the at least one load from the vehicle electrical system. The controller is further configured to determine an operational mode for each of the plurality of SCMs. Also the controller is configured to determine a synchronization pattern for the plurality of SCMs. The plurality of SCMs is configured to direct power to the at least one load based on the synchronization pattern. Each of the plurality of SCMs can includes a bi-directional converter and a plurality of electric switches. Each of the plurality of electric switches can connect to and control a battery module.

In yet another embodiment, a transport unit is provided. The transport unit includes a vehicle electrical system. The vehicle electrical system includes a bi-directional converter based battery module control system. The control system includes at least one load for operating the vehicle electrical system. The control system also includes a plurality of SCMs. The control system further includes a controller. The controller is configured to monitor the plurality of SCMs. The controller is also configured to monitor the at least one load from the vehicle electrical system. The controller is further configured to determine an operational mode for each of the plurality of SCMs. Also the controller is configured to determine a synchronization pattern for the plurality of SCMs. The plurality of SCMs is configured to direct power to the at least one load based on the synchronization pattern. The vehicle electrical system can include a power source supplying power to the at least one load and the plurality of SCMs.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

This disclosure relates generally to managing energy sources. More specifically, the disclosure relates to methods and systems for managing bi-directional converter based battery modules.

In particular, the embodiments described herein can manage and balance multiple energy sources including batteries in a vehicle electrical system. That is, the embodiments described herein can coordinate the switching of the multiple energy sources via, for example, bi-directional converters. Accordingly, power transfer efficiency can be improved, ripple current management components can be reduced, EMI mitigation items can be reduced, and thus system cost (including the cost of capacitance (energy storage) for ripple current (if any) and/or the cost of EMI mitigation components) can be lowered.

The embodiments described herein can be provided in, for example, a climate control system such as a TRS or MTRS for a transport unit (TU), an HVAC system for a vehicle, etc.

Figure 1A:
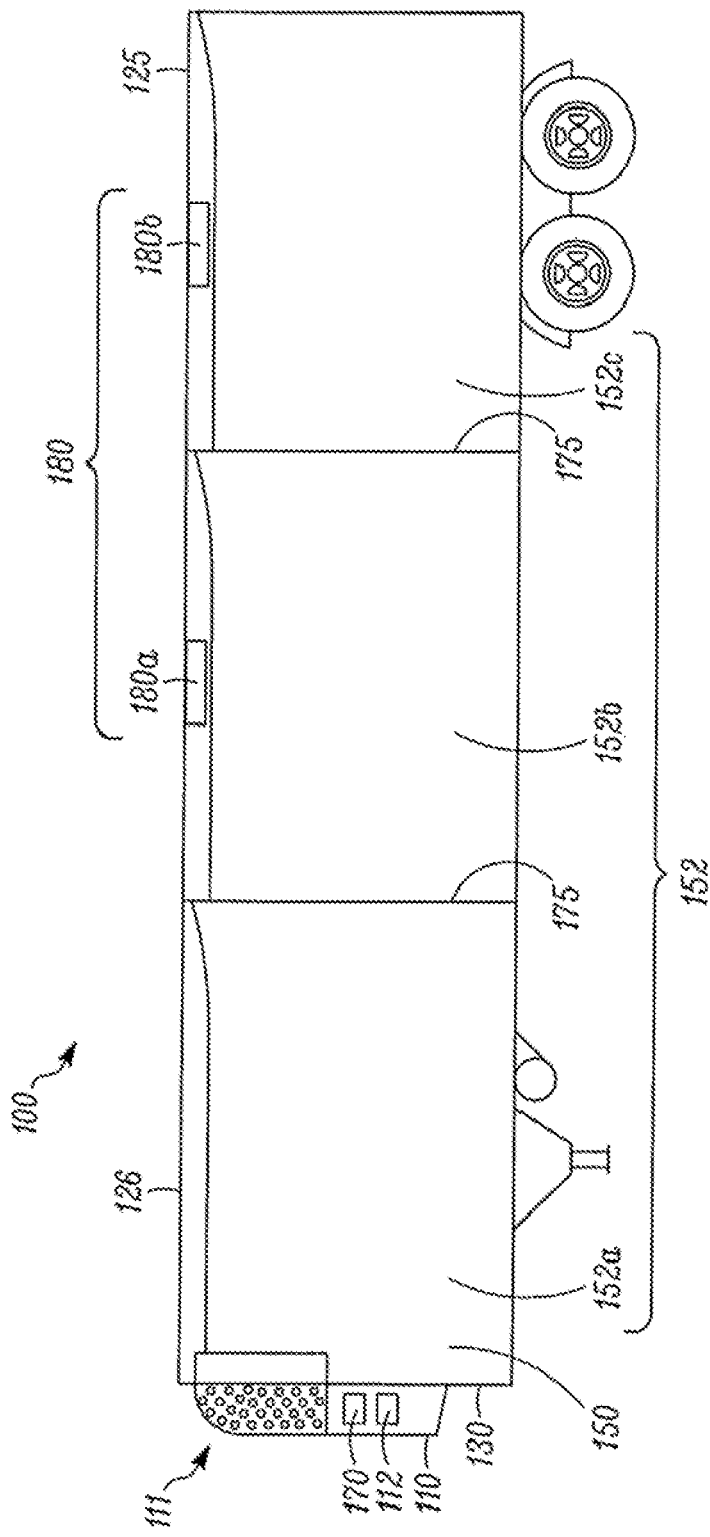
FIG. 1A illustrates a schematic cross sectional side view of a refrigerated transport unit with a multi-temp transport refrigeration system, according to one embodiment.

FIG. 1A illustrates one embodiment of a MTRS 100 for a TU 125 that can be towed, for example, by a tractor (not shown). The MTRS 100 includes a transport refrigeration unit (TRU) 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) (see FIG. 2) that are configured to measure one or more parameters (e.g., ambient temperature, compressor suction pressure, compressor discharge pressure, supply air temperature, return air temperature, humidity, etc.) of the MFRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

The TU 125 shown in FIG. 1A is a trailer unit. However, it will be appreciated that the embodiments described herein are not limited to trucks and trailer units, but can apply to any other type of transport unit including, but not limited to, a container (such as a container on a flat car, an intermodal container, etc.), a truck, a box car, or other similar transport unit.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1A, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine such as a two speed engine, a variable speed engine, etc. The power module 112 can provide power to, for example, the MTRS Controller 170, a compressor (not shown), a plurality of DC components (not shown), a power management unit (see FIG. 2), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDG), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (see FIG. 2), etc. The DC power source can receive mechanical and/or electrical power from, for example, a shore power source (e.g., Utility power, etc.), a prime mover (e.g., a diesel engine, etc.) coupled with a generator machine (e.g., a belt-driven alternator), etc. For example, in some embodiments, mechanical energy generated by a diesel engine is converted into electrical energy via a generator machine. The electrical energy generated via the belt driven alternator is then converted into DC electrical power via, for example, a bi-directional converter. The bi-directional converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

In some embodiments, the MTRS 100 for the TU 125 can include a heating, ventilation, air conditioning, and/or refrigeration system (HVACR). In some embodiments, the HVACR can be powered by an Auxiliary Power Unit (APU, see FIGS. 1B and 1C). The APU can be operated when a main prime mover of the TU 125 is turned off such as, for example, when a driver parks the TU 125 for an extended period of time to rest. The APU can provide, for example, power to operate a secondary HVACR unit to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system (see FIG. 2) for supplying electrical power to the electrical loads of the tractor, the MTRS 100, and/or the TU 125.

Figure 1B:
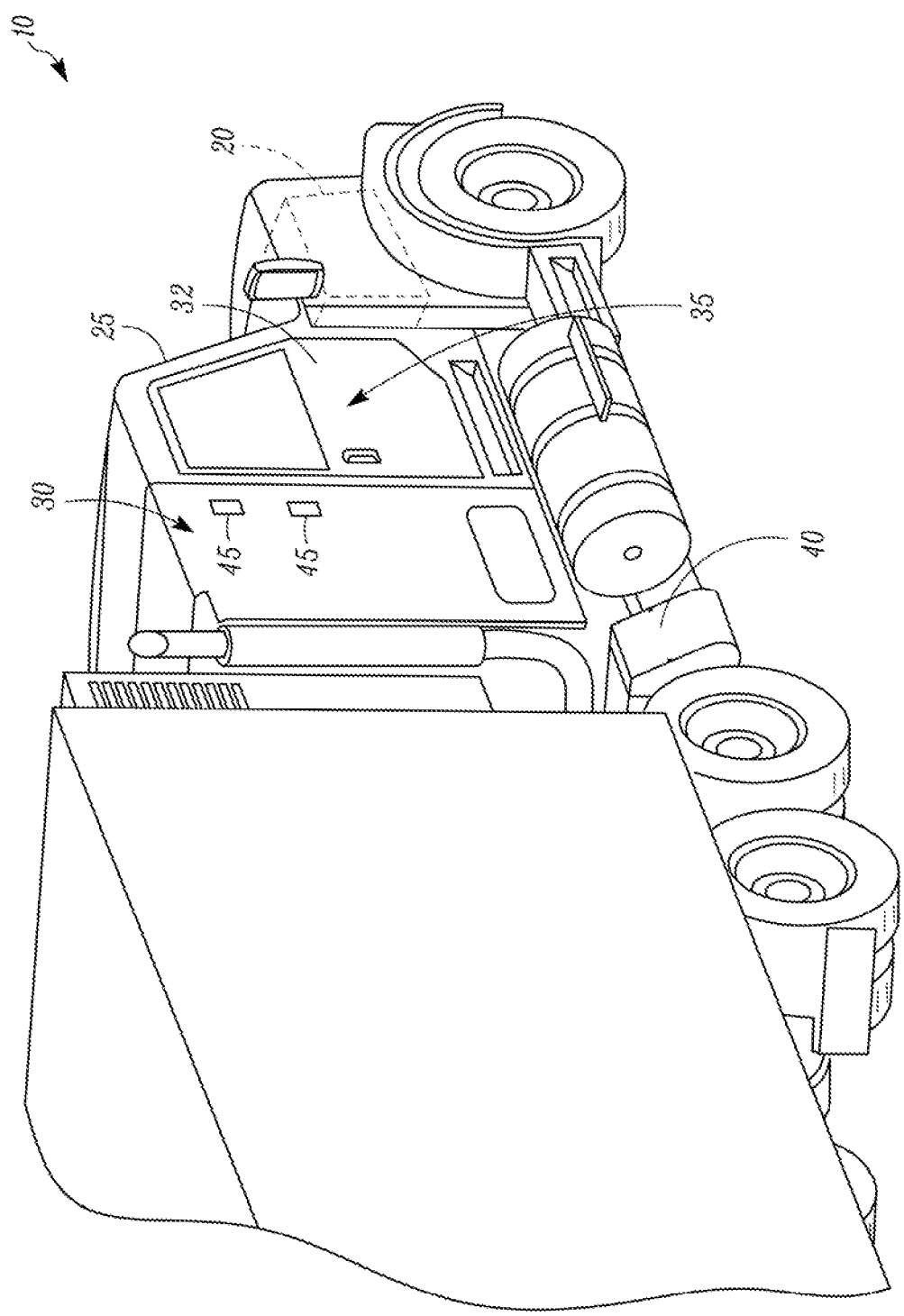
FIG. 1B illustrates a perspective view of a vehicle with an APU, according to one embodiment.

FIG. 1B illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessories 45 (e.g., electronic communication devices, cabin lights, a secondary HVAC system, secondary HVAC fan(s), sunshade(s) for a window/windshield of the vehicle 10, etc.).

The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, sunshade(s) for a window/windshield of the vehicle 10, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessories 45 and cabin accessories. The primary power source 20 can also provide power to the primary HVAC system and the secondary HVAC system. In some embodiments, the primary power source can be a prime mover such as, for example, a diesel engine.

The APU 40 is a secondary power unit for the vehicle 10 when the primary power source 20 is unavailable. When, for example, the primary power source 20 is unavailable, the APU 40 can be configured to provide power to one or more of the vehicle accessories, the cabin accessories, the primary HVAC system and the secondary HVAC system. In some embodiments, the APU 40 can be an electric powered. APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10.

Figure 1C:
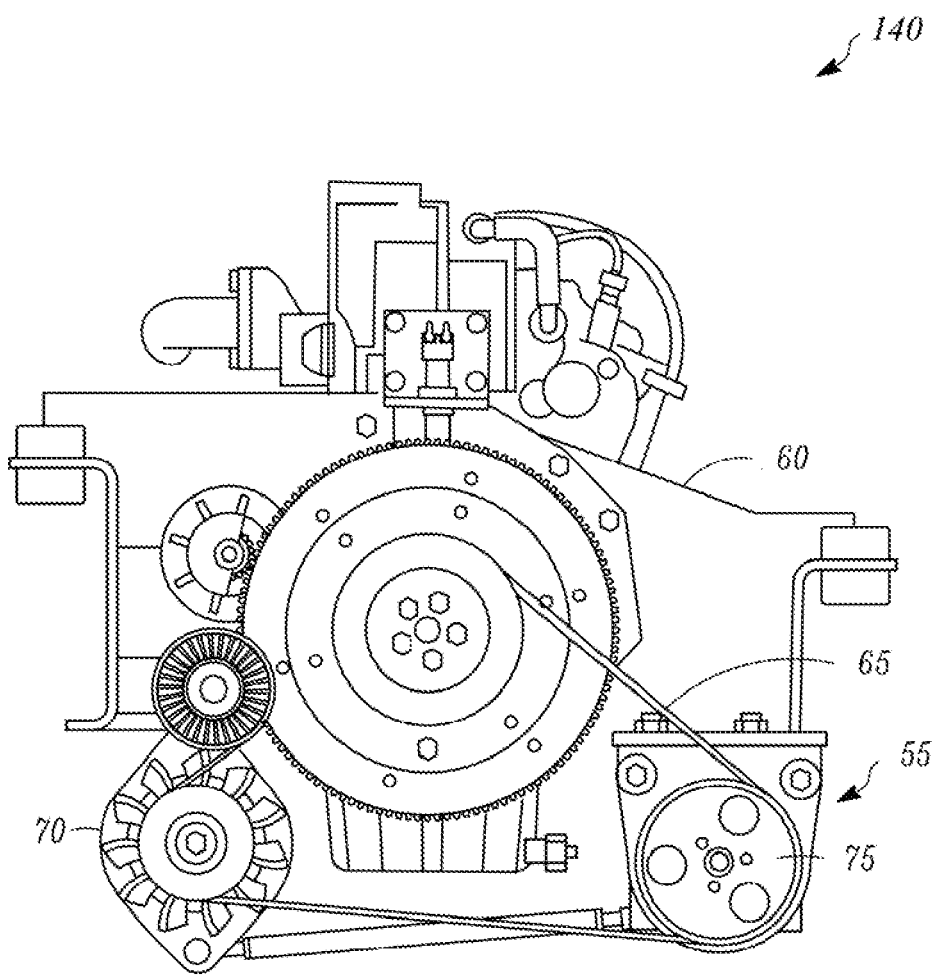
FIG. 1C illustrates a front view of an APU, according to one embodiment.

FIG. 1C illustrates a prime mover powered APU 140 that can be used with a vehicle (e.g., the vehicle 10 shown in FIG. 1B), according to one embodiment. The APU 140 includes a secondary prime mover 50 coupled to a belt 55 to drive an alternator 70 and a compressor 75 of a secondary HVAC system 55. The secondary prime mover 60 is separate from a primary power source of a vehicle (e.g., the primary power source 20 of the vehicle 10 shown in FIG. 1B). In some embodiments, the secondary prime mover 60 can be a diesel engine. The alternator 70 can provide power generated by the APU 140 to one or more vehicle accessories, cabin accessories, and a primary HVAC system. The secondary HVAC system 55 can provide conditioned air to a sleeping portion of a vehicle cabin (e.g., the sleeping portion 30 of the cabin 25 shown in FIG. 1B). In some embodiments, the APU 140 can be turned on or off by an occupant (e.g., driver or passenger) of the vehicle. For example, the occupant can turn on the prime mover 60 of the APU 140 to generate power when a primary power source of the vehicle is turned off.

Figure 2:
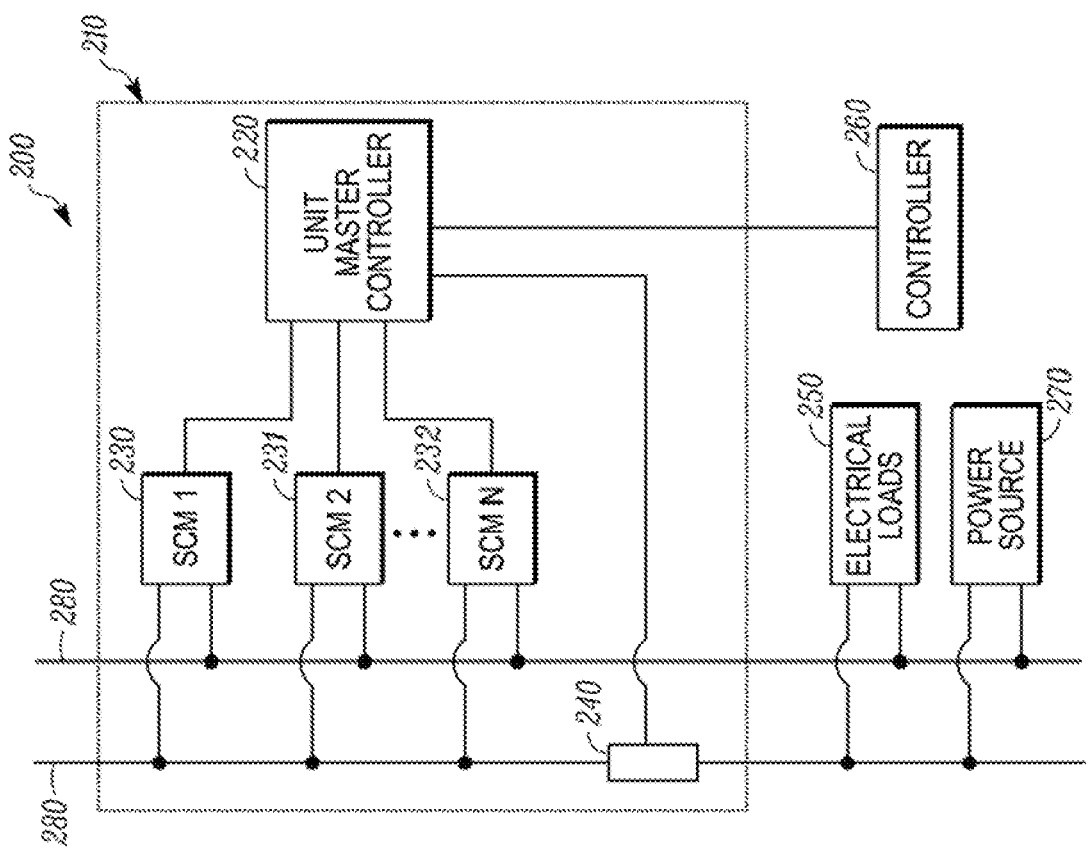
FIG. 2 illustrates a block diagram schematic of one embodiment of a vehicle electrical system of a climate control system, according to one embodiment.

In one embodiment, the APU (e.g., the APU 40 as shown in FIG. 1B and/or the AP 140 as shown in FIG. 1C) includes a vehicle electrical system (see FIG. 2).

Figure 1D:
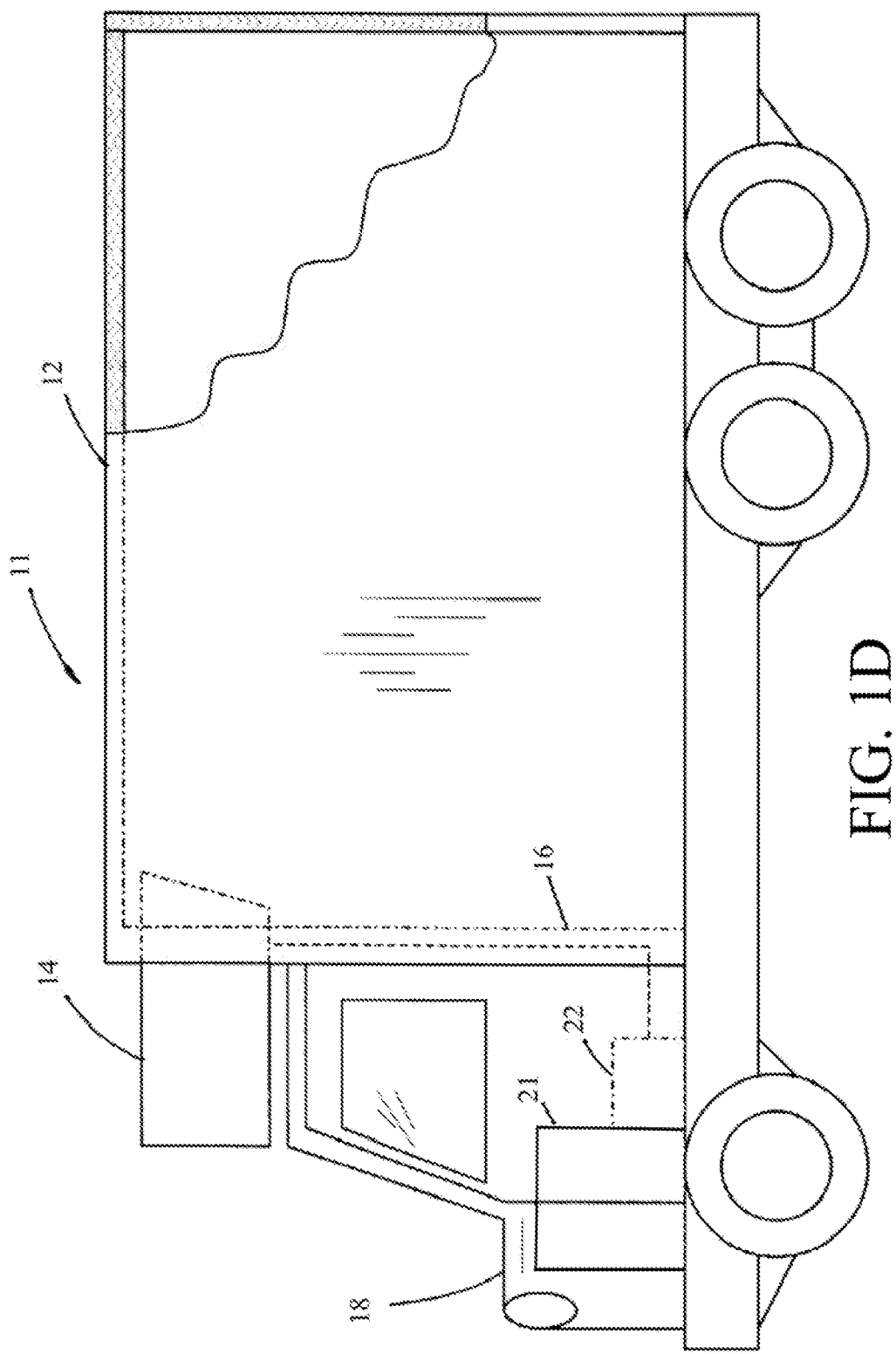
FIG. 1D illustrates a side view of a truck with a vehicle powered transport refrigeration unit, according to one embodiment.

FIG. 1D depicts a temperature-controlled straight truck 11 that includes a conditioned load space 12 for carrying cargo. A TRU 14 is mounted to a front wall 16 of the load space 12. The truck 11 further includes a cab 18, which houses a prime mover 21, such as a diesel engine, that provides power to move the truck 11 and to operate the TRU 14. In some embodiments, the prime mover 21 works in combination with an optional machine 22 (e.g., an alternator) to operate the TRU 14. In one embodiment, the TRU 14 includes a vehicle electrical system (see FIG. 2).

FIG. 2 illustrates a block diagram schematic of one embodiment of a vehicle electrical system 200. The vehicle electrical system 200 can be provided, for example, to supply electrical power to the electrical loads of the tractor, the MTRS 100, and/or the TU 125 shown in FIG. 1A. The vehicle electrical system 200 can also be provided as part of an APU (e.g., the APU 40 shown in FIG. 1B and/or the APU 140 shown in FIG. 1C) to supply electrical power to one or more loads connected to the APU. Also, the vehicle electrical system 200 can be provided in the TRU 14 shown in FIG. 1D to supply electrical power to the TRU 14.

The vehicle electrical system 200 includes a system bus 280. It will be appreciated that the common connections between components (i.e., in electrical communication with each other) of the vehicle electrical system 200 may be referred to generally as the vehicle electrical system "bus." The vehicle electrical system 200 also includes a power management unit 210. It will be appreciated that in other embodiments, the vehicle electrical system 200 can include two or more power management units 210. The vehicle electrical system 200 further includes a plurality of electrical loads 250, a power source 270, and a controller 260. The power management unit 210, the plurality of electrical loads 250, the power source 270, and the controller 260 connect to the system bus 280 and are in electrical communication with each other. Moreover, the vehicle electrical system 200 includes a sensor 240 that connects to the system bus 280. It will be appreciated that in other embodiments, the vehicle electrical system 200 can include two or more sensors 240.

In one embodiment, the power source 270 can be a power module (e.g., the power module 112 shown in FIG. 1A). In one embodiment, the controller 260 can be a MTRS controller (e.g., the MTRS controller 170 shown in FIG. 1A).

In one embodiment, an HVACR system can define an exemplary electrical load 250 of the transport unit. The transport unit can also include other electrical loads (e.g., vehicle accessories, lights, starter motor for prime mover, etc.). Generally, the electrical load 250 has power characteristics that relate to a load draw, which corresponds to the electrical power that is necessary for adequately powering the electrical load 250. In addition, charging of batteries on the transport unit can constitute another type of load. In one embodiment, the plurality of electrical loads 250 can also include one or more of the DC components described in FIG. 1A.

In one embodiment, the power management unit 210 includes a plurality of Smart Charging Modules (SCM) 230, 231, and 232, a sensor 240 and a unit master controller 220. Each of the SCM 230, 231, 232 connects to the system bus 280 and is configured to charge or discharge battery module(s). Each of the plurality of SCM 230, 231, 232 includes a bi-directional converter (see FIG. 3). Detailed descriptions on some embodiments of the bi-directional converters can be found in, for example, U.S. Pat. Nos. 8,441,228; 8,541,905; 9,199,543; and 9,102,241, each of which is incorporated herein by reference in its entirety. It will be appreciated that in some embodiments, the vehicle electrical system 200 can include only a single SCM.

The sensor 240 can be configured to sense/react the current and/or voltage from the system bus 280. It will be appreciated that in some embodiments, the sensor 240 is not part of the power management unit 210 but is part of the vehicle electrical system 200 such that the power management unit 210 communicates with the sensor 240 of the vehicle electrical system 200. In one embodiment, the sensor 240 can be a Hall effect sensor, a current transducer, etc.

The power management unit 210 further includes a unit master controller 220 that is configured to communicate with and control the SCM 230, 231, 232 and the sensor 240. The power management unit 210 can provide power from the SCMs 230, 231, 232 (by, for example, discharging battery modules associated with the SCMs 230, 231, 232) to the electrical loads (for example, electrical loads 250). The power management unit 210 can also coordinate power from the power source (for example, power source 270) to the SCMs 230, 231, 232 (to charge the battery modules associated with the SCMs 230, 231, 232). The timing (coordination) of providing power from or to the SCMs 230, 231, 232 can be controlled by the controller 220. In one embodiment, the unit master controller 220 of the power management unit 210 and the controller 260 of the vehicle electrical system 200 can be one single controller.

Figure 3:
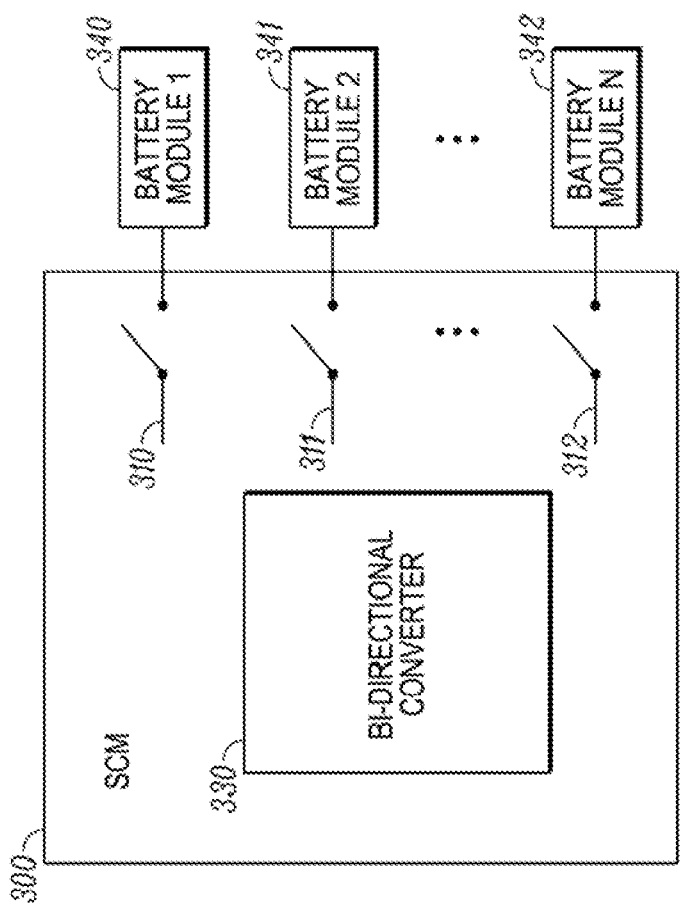
FIG. 3 illustrates a block diagram schematic of one embodiment of a Smart Charging Module of a power management unit, according to one embodiment.

FIG. 3 illustrates a block diagram schematic of one embodiment of a SCM 300 of a power management unit (such as, for example, the power management unit 210 shown in FIG. 2). The SCM 300 includes a bi-directional converter 330. The SCM 300 also includes a plurality of electric switch 310, 311, and 312. Each of the electric switches 310, 311, and 312 connects to (or disconnects from) a corresponding battery module 340, 341, and 342, respectively.

In one embodiment, the plurality of electric switches 310, 311, and 312 can be battery relays, electronic switches, etc. In one embodiment, the electronic switches 310, 311, and 312 can be, for example, semiconductor (solid-state) switches such as SmartFET type switches. SmartFET type switches can be field-effect transistor (FET) switches that have smart built-in features such as diagnose and protection capabilities. In one embodiment, one or more of the battery modules 340, 341, and 342 can be an auxiliary battery used to power accessories (e.g. lights and/or HVACR) when the vehicle is not in operation. In one embodiment, the plurality of electric switches 310, 311, and 312 is configured to selectively connect only one of the battery modules 340, 341, and 342 to the bi-directional converter 330 so that at any given time, only one of the battery modules 340, 341, and 342 connects to the bi-directional converter 330. A controller (such as, for example, the unit master controller 220 shown in. FIG. 2) can be configured to control the plurality of electric switches 310, 311, 312 to selectively connect only one of the battery modules 340, 341, and 342 to the bi-directional converter 330.

It will be appreciated that in certain embodiments, the plurality of electric switches 310, 311, and 312 can be configured to selectively connect more than one of the battery modules 340, 341, and 342 to the bi-directional converter 330. It will also be appreciated that the plurality of electric switches 310, 311, and 312 can be a single battery relay or a single electronic switch that can be configured to selectively connect one or more of the plurality of battery modules 340, 341, and 342 to the bi-directional converter 330.

The bi-directional converter 330 can connect to a system bus of a vehicle electrical system (such as, for example, the vehicle electrical system 200 shown in FIG. 2) so that the selected battery module(s) 340, 341, and 342 can deliver power to electrical loads (such as, for example, the electrical loads 250 shown in FIG. 2) of the vehicle electrical system or can be charged by other power sources. The controller (for example, the unit master controller 220 shown in FIG. 2) can control/switch a plurality of switches (not shown) of the bi-directional converter 330 to control when and where the bi-directional converter 330 directs current (for example, from the selected battery module to the electrical loads in a discharging mode, or from other power source to the selected battery module in a charging mode).

It will be appreciated that when the plurality of battery modules 340, 341, and 342 is being charged, the plurality of battery modules 340, 341, and 342 can be considered as the electrical loads of the vehicle electrical system. It will also be appreciated that the plurality of battery modules 340, 341, 342 of the SCM 300 can charge (i.e., deliver power to) battery module(s) of another SCM, or vice versa, to balance the power/energy stored in the battery module(s) of each SCM. It will further be appreciated that battery module(s) of different SCMs can be combined/selected until the total power-delivery capacity (e.g. measured in peak amperes at a given voltage, such as 12 volts) is sufficient for supplying the power needs of the vehicle electrical system. The selected battery module(s) of different SCMs can provide adequate power to the electrical loads of the vehicle electrical system based on the load draw.

Generally, the selected battery module(s) of different SCMs receive power from other power source during a charge phase, and discharges power to the electrical loads of the vehicle electrical system during a discharge phase. A charge phase may occur when for example, a power source (such as, for example, the power source 270 shown in FIG. 2) is inputting power to the vehicle electrical system of the vehicle, and a discharge phase may occur when for example, the power source is not inputting power to the vehicle electrical system of the vehicle (for example, when the prime mover is stopped and shore power is unavailable).

The bi-directional converter 330 of the SCM 300 can transfer power/energy between a power source (e.g., the power source 270 shown in FIG. 2) and the selected battery module(s) 340, 341, and 342. The bi-directional converter 330 is also referred to as a bi-directional multi-battery voltage converter. The bi-directional converter 330 can include a control circuit (not shown). The control circuit can selectively energize one or more of the plurality of electric switches 310, 311, and 312 to connect the selected battery module(s) 340, 341, and 342 with the bi-directional converter 330.

The SCM 300 can operate in one of three modes: a charge mode, a discharge mode, and a mill mode. When in a charge mode, the SCM 300 can charge one or more of the battery modules 340, 341, and 342 using a power source (for example, the power source 270 shown in FIG. 2). When in a discharge mode, the SCM 300 can deliver power from one or more of the battery modules 340, 341, and 342 to the electrical loads (for example, the electrical loads 250 shown in FIG. 2). The SCM 300 can also be operated in a null mode, where there will be no current flowing between any of the battery module 340, 341, and 342 and the rest of the vehicle electrical system. In the null mode, none of the battery modules 340, 341, and 342 is selected.

In the charge mode, the SCM 300 can function as a three-stage (bulk charging stage, absorption charging stage, and float charging stage) charger. Stage, as used herein, can also be referred to as mode. In the bulk charging stage, a fixed current can be supplied by the SCM 300 to rapidly recharge one or more of the battery modules 340, 341, 342 to a partial-charge point. In the bulk charging stage, charge current remains approximately constant, while charge voltage rises. The bulk charging stage can be used when the battery module(s) 340, 341, 342 to be charged are relatively depleted.

In the absorption charging stage, the voltage is held constant while the SCM 300 supplies varying levels of current to the battery module(s) 340, 341, 342 being charged. In the absorption charging stage, charge current decreases while the charge voltage is held at a constant, elevated level. The absorption charging stage can be used to complete charging of the battery module(s) 340, 341, 342 to be charged.

In the float charging stage, the battery voltage of the battery module(s) being recharged is monitored and the SCM 300 recharges the battery module(s) as needed to keep the battery module(s) 340, 341, 342 within a predetermined voltage range. Iii the float charging stage, both charge voltage and current are held constant. The float charging stage can be used to maintain battery charge of the battery module(s) 340, 341, 342 to be charged over an extended period of time.

Using a multiple stage charging method can be a rapid way to recharge a battery module while maintaining maximum battery life. The SCM 300 operational modes and/or stages can be determined by the controller (for example, the unit master controller 220 shown in FIG. 2). A change in the SCM operational modes/stages can indicate a load change. For example, when the SCM 300 switches from the hulk charging stage to the absorption charging stage (or vice versa), a load change can occur due to a varying load of the bi-directional converter 330 at different modes/stages.

The SCM 300 can determine a state of charge for the plurality of battery module(s) 340, 341, and 342 via a control circuit (which can include a micro controller that gets readings from a voltage sensor and/or a current sensor associated with the battery module(s) 340, 341, 342) and determine a selection sequence of the plurality of battery modules 340, 341, and 342 for charging or discharging the battery modules. State of charge for a battery module can indicate the battery module is fully charged, partially charged/discharged, or fully discharged. For example, the lowest state of charge can indicate the battery module is most in need of charging, and the highest state of charge can indicate the battery module can be fully charged in the shortest period of time. The selection sequence (the order of connecting the battery module(s) 340, 341, 342 to the bi-directional converter 330) indicates which battery module is to be selected (i.e., connected to the bi-directional converter 330) and when. For example, during charging, if the battery module 340 is fully charged, the SCM 300 can de-energize the electric switch 310 associated with the battery module 340 and energize one or both of the electric switches 311, 342 associated with the battery modules 341 or 342 to charge one or both of the battery modules 341, 342.

The controller (for example, the unit master controller 220 shown in FIG. 2) can override operation of the SCM 300 based on other criteria such as balancing the state of charge of the battery modules (so that the battery modules can be charged or discharged evenly) or maximizing battery life by preventing deep discharges. Balancing charging/discharging of the battery modules can also maximize energy storage capacity of the battery modules. If charging/discharging of the battery modules is not balanced, energy storage capacity of the battery modules and the battery life of the battery modules can be lost. The loss can be further exacerbated when one battery (or subunit/cell) becomes weaker than the others and dominates the charge/discharge cycle.

In one embodiment, charging (or discharging) the battery modules evenly (i.e., balanced charging/discharging) means that each battery receives about the same amount of current when charging (or gives about the same amount of current when discharging). For example, even if the battery module 340 is not fully charged, the controller may switch to charging battery module 341 or 342. Another example is that in a discharge mode, the SCM 300 can be setup to energize the electric switch 310 associated with the battery module 340 first, thereby connecting the battery module 340 to discharge first. If the controller determines that the battery module 340 has a greater discharge history than the battery module 341 or 342 (for example, in a predetermined period of time in the past, the frequency (or percentage of capacity, etc.) of the battery module 340 being discharged is greater than the frequency (or percentage of capacity, etc.) of the battery module 341 or 342), the controller may override the SCM 300 and select the battery module 341 or 342 to discharge first. The SCM 300 and/or the controller may be programmed with additional battery module switching criteria, such as a current limit (for example, the maximum current that can be drawn from a battery module) of discharging a battery module. The current limit can protect the battery modules 340, 341, 342 from an excessive discharge rate and can promote current sharing between the battery modules 340, 341, 342.

In operation, the controller (for example, the unit master controller 220 shown in FIG. 2) can manage and/or balance the battery modules 340, 341, and/or 342 to improve energy management of the vehicle electrical system. This can be useful, for example, in fully or partially electric systems in which there is a finite amount of electrical energy available.

The controller (for example, the unit master controller 220 shown in FIG. 2) can switch the bi-directional converter 330 ON (enabled) to draw current from a system bus of a vehicle electrical system or OFF (disabled) to prevent the bi-directional converter 330 from drawing current. For example, when the bi-directional converter 330 is switched ON, in the charging mode, the bi-directional converter 330 can direct current from one or more power sources to a selected battery module of the plurality of battery modules 340, 341, 342. When the bi-directional converter 330 is switched ON, in the discharging mode, the bi-directional converter 330 can direct current front a selected battery module of the plurality of battery modules 340, 341, 342 to one or more electrical loads (e.g., the electrical loads 250 shown in FIG. 2). When the bi-directional converter 330 is switched OFF, there is no current flow between the battery modules and the system bus via the bi-directional converter 330.

The bi-directional converter 330 can act as a discontinuous direct circuit (DC) electrical load and direct current at specific intervals depending on when the controller switches the bi-directional converter ON (enabled) or OFF (disabled). DC power in a discontinuous DC format, as used herein, refers to DC power that retains a constant polarity but can vary in voltage and/or current over time. In some embodiments, DC current in a discontinuous DC format can be periodic. For example, the DC power in the discontinuous DC format may have a periodic square shaped waveform, a periodic triangular shaped waveform, etc. that does not reverse in polarity. In some embodiments, DC current in a discontinuous DC format can be variable.

If the current draw (in discontinuous DC format) is in synchronization (also referred to as in phase) among multiple bi-directional converters then the current draw for the synchronized bi-directional converters can accumulate and cause a peak power surge. These peak power surges can also contribute to increased Electromagnetic (EM) emissions and decreased efficiency and poor performance of the system. For electromagnetic interference (EMI), when multiple bidirectional converters are switched, EMI can be created. When the switching of multiple bi-directional converters occurs at the same in-phase frequency, the EMI can be further increased.

Figure 4:
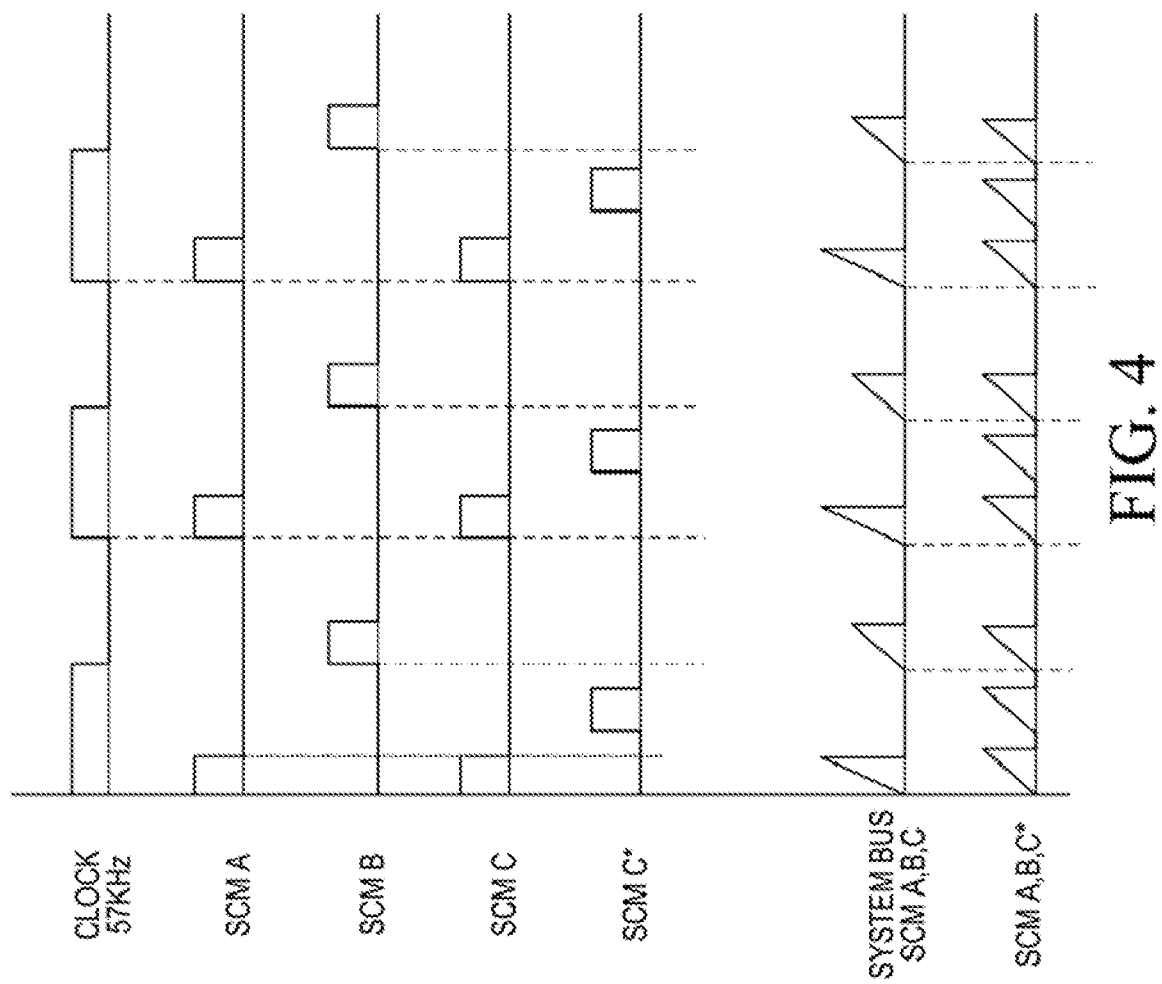
FIG. 4 illustrates DC current draw of SCMs in a discontinuous DC format and the current draw of SCMs on a system bus, according to one embodiment.

FIG. 4 illustrate DC current draw waveforms of multiple SCMs (each of the multiple SCMs can be similar to the SCM 300 shown in FIG. 3) in a discontinuous DC format and the current draw waveforms of multiple SCMs on a system bus of a vehicle electrical system (e.g., the vehicle electrical system 200 shown in FIG. 2). In one embodiment, the clock (i.e., the frequency of the periodic sequence the SCMs can draw current) can be 57 KHz. In one embodiment, the periodic frequency of the SCMs can be below 8 MHz. In FIG. 4, SCM A and SCM C are switched to draw current in phase (at about the same time). SCM B is switched to draw current out of phase with SCM A and/or SCM C. In such embodiment, SCM A can supply power to electrical load A (not shown), SCM B can supply power to electrical load B (not shown), and SCM C can supply power to electrical load C (not shown). It will be appreciated that loads A, B, and/or C can be the same electrical load or different electrical loads.

Out of phase means one SCM does not start drawing current until other SCM stops drawing current. There can be gap or no-gap between one SCM stops drawing current and other SCM starts drawing current. On the system bus, the current draw waveform of SCMs A, B, and C shows that the current draw of SCM A and SCM C add up. It will be appreciated that on the system bus, the current draw waveform is a triangle pulse due to inductance of the bi-directional converter(s) of the SCMs. The addition of the current draw of SCM A and SCM C can contribute to a ripple current and create noise on the system bus.

SCM C* shows that the current draw waveform of SCM C is coordinated (by the controller) to be out of phase with SCM A and/or SCM B. On the system bus, the current draw waveform of SCMs A, B, and C* does not add up since the current draw waveform of SCM C is shifted by the controller to the current draw waveform of SCM C*. In such embodiment, the time (see FIG. 5 for timeslot description) for SCM C to draw current is delayed (becomes the time of SCM C*, between SCM A and SCM B). The load (to which SCM C supplies power) operates in the same way (for example, same speed) when the power is supplied by SCM (i.e., SCM C with shift current draw waveform). On the system bus, the current draw from SCMs A, B, and C* are more uniform than the current draw from SCMs A, B, and C.

When there is a voltage change over time (DV/DT), there can be a spike on the system bus. The change can emit EM energy that can be detrimental to other components of the vehicle electrical system. If the spikes are stacked up on top of each other, for example, when the bi-directional converters of each of the SCMs are switched at the same time, the EM energy emission can be increased to a level that can increase the likelihood of damage to the other components of the vehicle electrical system. Current can represent the amount of energy radiated, and thus if the peak current is lowered, the EM energy emission can be lowered.

The embodiments described herein can coordinate the switching of the bi-directional converters of the SCMs to draw current at different times so that the peak overall current drawn by the SCMs can be lowered, and the switching noise created from the bi-directional converters of the SCMs on the system bus can be minimized. The embodiments described herein can reduce system cost and achieve more ideal system performance. Coordinating the power switching can reduce the cost to manage ripple current and EM emissions, and improve reliability and performance of the vehicle electrical system. The embodiments described herein can improve power transfer efficiency, lower system costs with reduced ripple management components, and reduce EMI mitigation items. The embodiments described herein can make sure that the current drawn from each SCM on the system bus is coordinated among all SCMs on the system bus to ensure low ripple current.

The embodiments described herein can coordinate and schedule switching events among multiple SCMs to minimize the ripple current. As a result, the amount of capacitance (energy storage) for ripple current (if any) can be minimized. The coordinated current draws if tied to the system bus can minimize required filtering because of ripple current reduction. This minimization can also help to meet Electro-Magnetic Compatibility regulations and/or pass EMI testing.

When the current sensor detects in-phase switching (by sensing the current on the system bus), the embodiments described herein can coordinate the current draws and manage the switching of the bidirectional converters of SCMs to optimize energy management.

Figure 5:
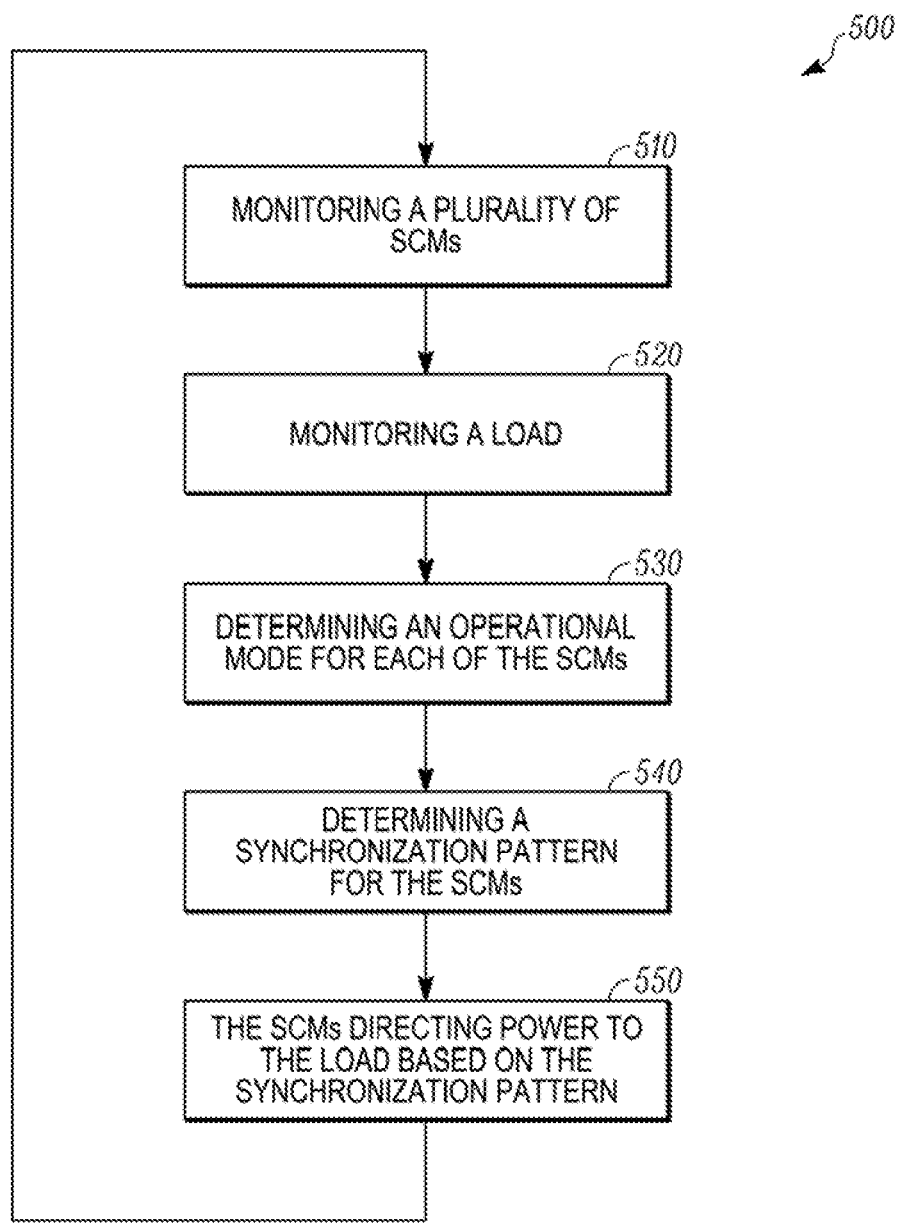
FIG. 5 is a flow chart illustrating a method for managing bi-directional converter based battery modules for a vehicle electrical system, according to one embodiment.

FIG. 5 is a flow chart illustrating a method 500 for managing bi-directional converter based battery modules for a vehicle electrical system for improved energy management.

The method 500 begins at 510 where a controller (for example, the unit master controller 220 shown in FIG. 2) monitors a plurality of SCMs (for example, the SCMs 1, 2 . . . N of FIG. 3) of a power management unit (for example, the power management unit 210 of FIG. 2). In one embodiment, monitoring the plurality of SCMs includes the controller establishing communication with each of the plurality of SCMs. When each SCM logs onto the vehicle electrical system (or is turned on), a procedure is performed and the controller establishes communication with the SCM.

Communication between the controller and the SCMs can be via a Controller Area Network (CAN). CAN is a message-based protocol designed to allow microcontrollers and devices to communicate with each other in applications without a host computer. Each SCM has a unique identifier (e.g., serial number). The controller can send a global message (e.g., a global login request) to the nodes (e.g., the SCMs, etc.) of the CAN and request the nodes to reply. CAN communications can be self-arbitrating (for example, with respect to which message has higher priority over others) or an arbitration scheme can be devised to make sure each SCM has a chance to reply to the global login request.

A login routine can be initiated between the controller and each individual SCM after the global login request. During the login routine, the request (e.g., from the SCM) to join the network (e.g., the CAN) can be granted (e.g., by the controller) and the SCMs parameters can be set by the controller. The login routine/procedure can be performed by the controller. As a result, the controller can obtain information regarding the number and arrangement of the converter/battery network (e.g., the CAN). In instances when a loss of communication is detected by the controller (for example, the controller cannot read values from an identified node of the CAN), then a re-initialization of the CAN via the same global login request detailed above can be started.

Through the login routine, the controller can determine how many SCMs are connected to the vehicle electrical system and can determine a topology of the vehicle electrical system based on the number of SCMs connected to the vehicle electrical system. Topology of the vehicle electrical system is the arrangement of the vehicle electrical system, including the components that constitute the vehicle electrical system and the connections among the components. The method 500 then proceeds to 520.

At 520, the controller monitors a load (for example, the electrical loads 250 shown in FIG. 2) drawing power from the vehicle electrical system. For example, the controller can monitor the status (e.g., the load is turned on or off, the speed of the load, the capacity of the load, etc.) of a load and determine when to provide a current draw to the load and/or how much of the current draw to provide the load. It will be appreciated that the battery module(s) can be a load when in charging mode. When the controller monitors the load, the controller can also monitor a current demand from the load. The method 500 then proceeds to 530.

At 530, the controller determines an operational mode for each of the SCMs. The operational mode can be, for example, one of a charging mode, a discharging mode, and a null mode. For example, if the controller determines that power/current should be supplied to a load, the controller can determine that at least one of the SCMs be in the discharging mode. If the controller detects a power source (for example, a shore power) is connected to the power management unit, the controller can determine that at least one of the SCMs be in the charging mode. If there is no power/current request from electrical loads, and/or there is no external power source (or there is no charging needs from battery modules), the controller can determine that at least one of the SCMs be in the null mode. The charging mode can include a bulk charging mode/stage, an absorption charging mode/stage, and a float charging mode/stage. It will be appreciated that a change of the operational mode can indicate a load change. The method 500 then proceeds to 540.

At 540, the controller determines a synchronization pattern for the SCMs based on information obtained at 520 and 530 so that the controller can switch and control the SCMs to draw current (from other power source to a selected battery module or from the selected battery module to the electrical loads). In one embodiment, the controller determining a synchronization pattern for the SCMs can be, for example, determining when a first SCM starts drawing current and when the first SCM stops drawing current. In such embodiment, the controller can also determine when a second SCM starts drawing current and when the second SCM stops drawing current, and so on. The synchronization pattern for the SCMs is a pattern for phasing current draws of the SCMs such that a current draw for each of the SCMs does not overlap (for example, the second SCM does not start drawing current until a time or after the first SCM stops drawing current) with each other. The synchronization pattern for the SCMs can ensure that peaks in the current draw of each SCM are phased apart from each other to reduce and/or zero out peaks in current draw (e.g., the ripple current). In one embodiment, the controller determining a synchronization pattern for the SCMs can be, enabling (switching on) and/or disabling (switching off) each of the SCMs at different times.

In one embodiment, determining the synchronization pattern for the SCMs can include the controller determining a plurality of timeslots that corresponds to the plurality of SCMs. Based on the topology of the SCMs, the controller can determine how many timeslots can be available in one cycle of a periodic sequence based on a clock (for example, a 57 KHz clock). Then the controller can assign each of the timeslots to each of the SCMs based on the topology and the load, and/or based on information such as priority or other criteria for current draw such as current limit, discharge history, balancing state of charge, and/or maximizing battery life by preventing deep discharges.

The controller can send a periodic message (for example, a metronome message) to communicate with the SCMs about the assignment of the timeslots. The periodic message can include the identifications (IDs) of the SCMs and the timeslots assigned to the IDs, respectively. The periodic message can be sent from the controller to the SCMs via a Controller Area Network (CAN) which has higher priority than non-control messages (which can be sent via, for example, the system bus). One advantage of using a periodic message is that when a load change occurs, or when a current sensor detects in-phase current draws, the controller can update the assignments of the timeslots and communicate with the SCMs about the new assignments quickly. Another advantage of using a periodic message is that since the topology of the vehicle electrical system is known by the controller, the controller can maximize current draw each of the SCMs can make in every cycle of the periodic sequence without accounting for shifts in operation. For example, since the controller knows how many SCMs are in the vehicle electrical system, the controller can assign a continuous number of timeslots to a first SCM and another continuous number of timeslots to a second SCM, and so on. The SCM can be configured to draw current only at the timeslot(s) assigned to the SCM. The SCM can be configured not to draw current at the timeslot(s) assigned to other SCM(s). When being assigned a continuous number of timeslots, the SCM can draw current continuously during those timeslots without shifting operation (e.g., shifting from drawing current to stopping drawing current or vice versa) in every timeslot.

In another embodiment, determining the synchronization pattern for the SCMs can include the controller assigning a sequence number to each of the SCMs to control a start sequence of the SCMs. The start sequence of the SCMs can indicate when each of the SCMs starts drawing current respectively. The sequence number can be based on a SCM procedure. When a SCM logs-in, a value can be assigned to the SCM. The value can determine the sequence of when the SCM will be switched to draw current. For example, when a first SCM logs-in, value 1 can be assigned (for example, by the controller) to the first SCM and the first SCM can be switched first (for example, on the first timeslot(s)) in a cycle of the periodic sequence. When a second SCM logs-in, value 2 can be assigned to the second SCM and the second SCM can be switched second (for example, on the second timeslot(s)) in the cycle of the periodic sequence. If there are no other SCMs, the first SCM can be switched again (for example, on the third timeslot(s) in the cycle of the periodic sequence) after the second SCM stops drawing current. The controller can use a start sequence to setup the switches to switch the SCMs based on the sequence number. One advantage of using a less periodic start sequence as described here is that frequent resynchronization (which can lead to more overhead of communication messages) can be prevented.

The method 500 then proceeds to 550. At 550, the SCMs direct power to the load based on the synchronization pattern. In one embodiment, the SCMs are switched and the start timing of switching can be at different intervals (for example, at the timeslots assigned to the SCMs). In another embodiment, the SCMs can be switched sequentially based on the start sequence setup by the controller. The method 500 then proceeds back to 510.

Figure 6:
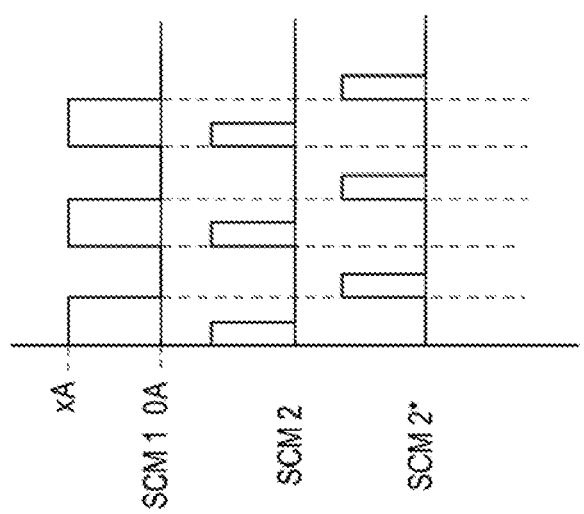
FIG. 6 illustrates DC current draw of SCMs in a discontinuous DC format with different pulse width, according to one embodiment.

FIG. 6 illustrates a DC current draw of SCMs in a discontinuous DC format with different pulse widths. In one embodiment, when there is current demand from a load, the controller can turn on all available SCMs. For example, when there are two SCMs available, each SCM can provide power to one half of the load.

In one embodiment, the state of charge of a selected battery module of a SCM can vary. Thus, a duration of the pulses (i.e., pulse width) of the current draw for each SCM can be different depending on the voltage/power available at the selected battery module of the SCM, or depending on the load. The selected battery module can become deeply depleted that other battery modules or the load can be large when the battery is selected compared with the load when other battery module(s) is/are selected. A deeply depleted battery module (or cell) may take more current (means longer pulse width than more charged battery module(s)). More charged battery module takes less current and has smaller/shorter pulse width than less charged battery module(s). The controller is configured to select a group of SCMs (or their corresponding battery modules) to maximize the usage of the timeslots in a cycle of the periodic sequence. For example, if deeply depleted battery modules have a pulse width that is 75% of a cycle of the periodic sequence, and more charged battery modules have a pulse width that is 25% of a cycle, choosing two deeply depleted battery modules can lead to overlapping pulse widths of the battery modules thereby creating a ripple current. Choosing one deeply depleted battery module and one more charged battery module can help ensure a continuous DC current draw and minimize peak power. In such example, if two deeply depleted battery modules are selected, ripple current would be inevitable. In such example, if two more charged battery modules are selected, the usage of the timeslots in a cycle of the periodic sequence might not be maximized.

The controller can actively coordinate the bi-directional converters to minimize peak power surges based on variable pulse widths of the SCMs. The coordinating of the SCMs can be, for example, performed using the periodic messages (such as the metronome messages). For example, the controller can divide the cycle of the periodic sequence into 100 timeslots, assign 50 continuous timeslots to SCM 1 (which can be, for example, deeply depleted and require more current), assign 20 continuous timeslots to SCM 2 (which can be, for example, more charged that SCM1), assign 20 timeslots continuous to SCM 3, etc. to maximize the usage of the timeslots and to optimize the system.

In FIG. 6, SCM 1 has longer pulse width than SCM2. SCM 2\* shows the current draw of SCM 2 after the synchronization pattern described above is applied.

The embodiments described above can prevent an occurrence of ripple current by applying a synchronization pattern to coordinate multiple SCMs. In some embodiments, when an occurrence of ripple current happens, the controller can be configured to update the synchronization pattern to reduce the ripple current. The occurrence of ripple current can happen, for example, when there is a load change of the vehicle electrical system. An operational mode change of an SCM can also cause a load change. In one embodiment, a current sensor can sense a current on a system bus of the vehicle electrical system. When the controller determines a load change based on the sensed current on the system bus, the controller can determine a new synchronization pattern for the SCMs. The SCMs can then direct power to the load based on the new synchronization pattern. If the controller determines that no load change has occurred, the synchronization pattern can remain the same and not be updated.

It will be appreciated that the controller can issue a global reset that resets all the devices (for example, the SCMs) at the same time. The clock of switching SCMs by the controller by default is in-phase (i.e., at the same time). A global reset can help ensure that each of the SCMs can draw current at or about the same time. Then a synchronization pattern can be established by the controller to reduce ripple current.

Aspects:

It is appreciated that any of aspects 1-7, 8-10 and 11-12 can be combined.

Aspect 1. A bi-directional converter based battery module control method for a vehicle electrical system, the method comprising:
  monitoring a plurality of Smart Charging Modules (SCMs) to establish communication with each of the plurality of SCMs;
  monitoring a load from the vehicle electrical system;
  determining an operational mode for each of the plurality of SCMs;
  determining a synchronization pattern for the plurality of SCMs based on the load and the operational mode; and
  one of more of the plurality of SCMs directing power to the load based on the synchronization pattern.

Aspect 2. The method of aspect 1, wherein monitoring a plurality of Smart Charging Modules (SCMs) to establish communication with each of the plurality of SCMs includes
  determining a topology of the plurality of SCMs,
  wherein determining the synchronization pattern for the plurality of SCMs includes:
    determining a plurality of timeslots that corresponds to the plurality of SCMs;
    assigning each of the plurality of timeslots to each of the plurality of SCMs based on the topology and the load; and
    periodically communicating with each of the plurality of SCMs the assignment of the timeslots.

Aspect 3. The method of aspect 1, wherein determining the synchronization pattern for the plurality of SCMs includes assigning a sequence number to each of the plurality of SCMs to control a start sequence of the plurality of SCMs.

Aspect 4. The method of aspect 1, wherein determining the synchronization pattern for the plurality of SCMs includes:
  determining a state of charge for each of the plurality of SCMs;
  determining a pulse width value for each of the plurality of SCMs based on the state of charge;
  determining a plurality of timeslots based on the pulse width value for each of the plurality of SCMs; and
  assigning, each of the plurality of SCMs a timeslot of the plurality of timeslots.

Aspect 5. The method of any one of aspects 1-4, wherein the synchronization pattern is a pattern for phasing current draws such that a current draw for each of the plurality of SCMs do not overlap.

Aspect 6. The method of any one of aspects 1-5, further comprising:
  a current sensor sensing a current on a system bus of the vehicle electrical system; and
  a controller monitoring the current sensed by the current sensor; and
  the controller determining a load change based on the monitored current and when the controller determines a load change:
    the controller determining a new synchronization pattern for the plurality of SCMs; and
    the plurality of SCMs directing power to the load based on the new synchronization pattern.

Aspect 7. The method of any one of aspects 1-5, further comprising determining a load change based on a change in the operational mode,
wherein the operational mode includes a charging mode and a discharging mode, the charging mode includes a bulk charging mode, an absorption charging mode, and a float charging mode.

Aspect 8. A bi-directional converter based battery module control system for a vehicle electrical system, the bi-directional converter based battery module control system comprising:
at least one load;
a plurality of Smart Charging Modules (SCMs); and
a controller configured to:
monitor the plurality of SCMs;
monitor the at least one load from the vehicle electrical system;
determine an operational mode for each of the plurality of SCMs; and
determine a synchronization pattern for the plurality of SCMs,
wherein the plurality of SCMs is configured to direct power to the at least one load based on the synchronization pattern.

Aspect 9. The bi-directional converter based battery module control system of aspect 8, wherein each of the plurality of SCMs includes:
a bi-directional converter; and
a plurality of electric switches.

Aspect 10. The bi-directional converter based battery module control system of either one of aspects 8 and 9, further comprising:
a current sensor configured to sense a current on a system bus of the vehicle electrical system,
wherein the controller is configured to monitor the current sensed by the current sensor, the controller is configured to determine a load change based on the monitored current and when the controller determines a load change:
the controller is configured to determine a new synchronization pattern for the plurality of SCMs, and
the plurality of SCMs is configured to direct power to the load based on the new synchronization pattern.

Aspect 11. A transport unit comprising:
a vehicle electrical system having a bi-directional converter based battery module control system,
wherein the bi-directional converter based battery module control system includes:
at least one load;
a plurality of Smart Charging Modules (SCMs); and
a controller configured to:
monitor the plurality of SCMs;
monitor the at least one load from the vehicle electrical system;
determine an operational mode for each of the plurality of SCMs; and
determine a synchronization pattern for the plurality of SCMs,
wherein the plurality of SCMs is configured to direct power to the at least one load based on the synchronization pattern.

Aspect 12. The transport unit of aspect 11, wherein the vehicle electrical system includes a power source supplying power to the at least one load and the plurality of SCMs.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A bi-directional converter based battery module control method for a vehicle electrical system, the method comprising:
monitoring a plurality of Smart Charging Modules (SCMs) to establish communication with each of the plurality of SCMs;
monitoring a load from the vehicle electrical system;
determining an operational mode for each of the plurality of SCMs;
determining a synchronization pattern for the plurality of SCMs based on the load and the operational mode; and
one of more of the plurality of SCMs directing power to the load based on the synchronization pattern,
wherein the synchronization pattern is a pattern for phasing current draws such that a current draw for each of the plurality of SCMs do not overlap.

2. The method of claim 1, wherein monitoring a plurality of Smart Charging Modules (SCMs) to establish communication with each of the plurality of SCMs includes
determining a topology of the plurality of SCMs,
wherein determining the synchronization pattern for the plurality of SCMs includes:
determining a plurality of timeslots that corresponds to the plurality of SCMs;
assigning each of the plurality of timeslots to each of the plurality of SCMs based on the topology and the load; and
periodically communicating with each of the plurality of SCMs the assignment of the timeslots.

3. The method of claim 1, wherein determining the synchronization pattern for the plurality of SCMs includes assigning a sequence number to each of the plurality of SCMs to control a start sequence of the plurality of SCMs.

4. The method of claim 1, wherein determining the synchronization pattern for the plurality of SCMs includes:
determining a state of charge for each of the plurality of SCMs;
determining a pulse width value for each of the plurality of SCMs based on the state of charge;
determining a plurality of timeslots based on the pulse width value for each of the plurality of SCMs; and
assigning each of the plurality of SCMs a timeslot of the plurality of timeslots.

5. The method of claim 1, further comprising:
a current sensor sensing a current on a system bus of the vehicle electrical system; and
a controller monitoring the current sensed by the current sensor; and
the controller determining a load change based on the monitored current and when the controller determines a load change:

the controller determining a new synchronization pattern for the plurality of SCMs; and the plurality of SCMs directing power to the load based on the new synchronization pattern.

6. The method of claim 1, further comprising determining a load change based on a change in the operational mode, wherein the operational mode includes a charging mode and a discharging mode, the charging mode includes a bulk charging mode, an absorption charging mode, and a float charging mode.

7. A bi-directional converter based battery module control system for a vehicle electrical system, the bi-directional converter based battery module control system comprising:
at least one load;
a plurality of Smart Charging Modules (SCMs); and
a controller configured to:
monitor the plurality of SCMs:
monitor the at least one load from the vehicle electrical system;
determine an operational mode for each of the plurality of SCMs; and
determine a synchronization pattern for the plurality of SCMs based on the load and the operational mode,
wherein one of more of the plurality of SCMs is configured to direct power to the at least one load based on the synchronization pattern,
wherein the synchronization pattern is a pattern for phasing current draws such that a current draw for each of the plurality of SCMs do not overlap.

8. The bi-directional converter based battery module control system of claim 7, wherein each of the plurality of SCMs includes:
a bi-directional converter; and
a plurality of electric switches.

9. The bi-directional converter based battery module control system of claim 7, further comprising:

a current sensor configured to sense a current on a system bus of the vehicle electrical system,
wherein the controller is configured to monitor the current sensed by the current sensor, the controller is configured to determine a load change based on the monitored current and when the controller determines a load change:
the controller is configured to determine a new synchronization pattern for the plurality of SCMs, and
the plurality of SCMs is configured to direct power to the load based on the new synchronization pattern.

10. A transport unit comprising:
a vehicle electrical system having a bi-directional converter based battery module control system,
wherein the bi-directional converter based battery module control system includes:
at least one load;
a plurality of Smart Charging Modules (SCMs); and
a controller configured to:
monitor the plurality of SCMs;
monitor the at least one load from the vehicle electrical system;
determine an operational mode for each of the plurality of SCMs; and
determine a synchronization pattern for the plurality of SCMs based on the load and the operational mode,
wherein one or more of the plurality of SCMs is configured to direct power to the at least one load based on the synchronization pattern,
wherein the synchronization pattern is a pattern for phasing current draws such that a current draw for each of the plurality of SCMs do not overlap.

11. The transport unit of claim 10, wherein the vehicle electrical system includes a power source supplying power to the at least one load and the plurality of SCMs.

* * * * *